Sept. 16, 1958 J. M. HANSEN 2,852,618

ELECTRO-MAGNETIC TRANSDUCER

Filed April 2, 1956

INVENTOR.
JAY M. HANSEN,
BY
ATTORNEY.

United States Patent Office 2,852,618

Patented Sept. 16, 1958

2,852,618

ELECTRO-MAGNETIC TRANSDUCER

Jay M. Hansen, Los Angeles, Calif., assignor to Hughes Aircraft Company, Culver City, Calif., a corporation of Delaware Application April 2, 1956, Serial No. 575,670

8 Claims. (Cl. 179—100.2)

The present invention relates generally to magnetic transducers and particularly to magnetic transducers for recording, reproducing or erasing magnetic records.

One of the major problems in the use of conventional magnetic heads for the recording of information at high density is the fact that the impedance of such a head at high frequencies is greater than the impedance of the head at low frequencies, and accordingly the head operates at decreased efficiency in the high frequency regions. It has been proposed that the high frequency efficiency of such heads be increased by the use of integral transformer types of design such as disclosed for example in a co-pending U. S. patent application, Serial No. 499,142, filed April 4, 1955, entitled "Integral Transformer Electromagnetic transducer," by D. F. Brower and R. H. Griest. While the transducer disclosed in the Brower et al. application operates at improved efficiency in the high frequency region as compared to prior transducers, it is not readily adaptable for the recording of direct and low frequency currents.

It is therefore an object of the present invention to provide an improved electro-magnetic transducer or head having a novel form of shielding which lowers the inductance of the head at high frequencies, thereby lowering the high frequency impedance of the head and improving its high frequency response.

A further object of the present invention is to provide an improved magnetic heat which displays substantially constant impedance at relatively high frequencies and may be used as well for the recording of direct currents.

A still further object of the present invention is to provide an improved magnet transducer utilizing eddy current shielding to achieve a uniformity of response over a wide frequency range.

Another object of the present invention is to provide a magnetic transducer utilizing eddy current shielding characterized by an inherent simplicity and ease of manufacture.

An electro-magnetic transducer, in accordance with one form of the present invention, comprises a transducer core structure of ferro-magnetic material having a gap in one side thereof to provide a discontinuity in the flux path in the core. The gap defines the juxtaposed edges of a pair of adjacent pole faces lying along the outer surface of the core structure and adapted to confront a magnetic record body. A shim of electro-conductive material is arranged to fill the gap and a discontinuous eddy current shield is provided by applying a thin layer or sheet of conductive material to the remaining surfaces of the core structure. The conductive shim in the gap is electrically connected to the adjacent portions of the shield. An exciting winding comprising a plurality of turns of wire is wound about the core structure and at least a portion of the eddy current shield formed by the conductive sheet. In accordance with another embodiment of the present invention the shim and eddy current shield are fabricated from a piece of material arranged to form an open turn about a portion of the transducer core structure with one portion of the shield lying in a gap in the core structure, and an exciting winding is provided about another portion of the shield.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
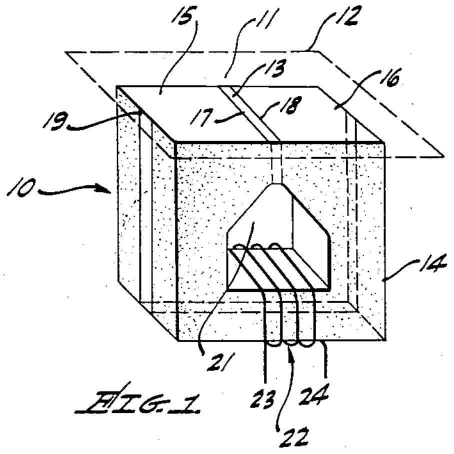
Fig. 1 is a perspective view of an electro-magnetic transducer provided in accordance with the present invention and utilizing a substantially rectangular core structure.

Referring now to the drawings wherein the same characters are used to refer to similar elements throughout the several figures, an electro-magnet transducer, as shown in Fig. 1, comprises a transducer core structure 10 of ferro-magnetic material having a gap 11 in one of the sides thereof before which a magnetic recording medium may be moved in a plane generally designated 12. The gap 11 provides a discontinuity in the flux path of the core structure 10 and defines the juxtaposed edges 17, 18, of a pair of adjacent pole faces 15, 16, lying along the outer surface of core structure 10 and adapted to confront a magnetic record body moving in the plane 12. A shim 13 of electro-conductive material is arranged to fill the gap 11 in the core structure 10, while the remaining surfaces of the core structure other than the pole faces 15 and 16 are covered with a discontinuous or open circuited layer 14 of conductive material to provide an eddy current shield. The conductive layer 14 is arranged to establish electrical connection with the adjacent portions of the shim 11 at its ends and inner edge. An exciting winding 22 comprising a plurality of turns of wire is wound about the core structure to encircle at least a portion of the eddy current shield formed by conductive layer 14.

More particularly, the core structure 10 is substantially rectangular in shape and may be composed of ferrite or similar ferro-magnetic material having high magnetic permeability and low magnetic retentivity. A central window 21 is provided in the core structure 10 to permit the exciting coil 22 to be wound on the core structure. The gap 11 of appropriate width is cut in one side of the transducer, which will hereafter be referred to as the pole face side of the transducer. The gap 11 passes completely through the core structure 10 thereby providing a discontinuity in the magnetic circuit of the core. Preferably, the gap should lie in a plane at right angles to the magnetic path defined by the core structure in the region of gap 11 in order to make full use of the flux concentrating effect of the eddy current shield 14. The portions of the transducer core 10 confronting one or both sides of the gap 11, which will hereafter be referred to as the pole tips of the transducer, may be arranged to have a cross-sectional area substantially less than the cross-sectional area of the remaining portions of core 10. This reduction in cross-sectional area may be easily achieved, for example, by providing a substantially V-shaped enlargement of the window 21 immediately adjacent the gap 11.

The shim 13 is a strip of electro-conductive material such as copper or silver and is arranged to completely fill the gap 11. The edge of the shim 13 lying in the pole face plane is arranged to be flush with the adjacent edges 17, 18 of the core structure. In accordance with conventional practice the shim may be of silver or copper having a thickness of 1 or 2 mils. A portion of the remaining surfaces of the transducer core structure are covered with an open circuited layer 14 of conductive material. Where the pole faces 15 and 16 lie in a common plane, the layer 14 need not cover them, but if the pole faces are disposed at an angle with respect to each other, the discontinuous layer 14 may cover the pole faces as well as the remainder of the transducer core structure 10. This layer may be formed of copper or silver or alternatively may be painted or plated directly on core structure 10, where the core structure itself is composed of non-conductive magnetic material. The layer may have a thickness substantially identical with the thickness of the shim 13. In order to prevent layer 14 from forming a short circuited turn about the core structure an appropriately placed non-conductive gap should be provided in the layer. This gap, as shown in Fig. 1, may be achieved by providing that layer 14 be interrupted along a continuous path such as a gap 19 about the outside of the core structure. Where the layer 14 is painted or plated on the core structure 10, the gap 19 may be conventionally provided for by masking the appropriate region of the core prior to the coating operation. The layer 14 should be arranged to establish electrical contact with the ends and inner edge of the shim 13. The coil 22 is wound on the core 10 in such manner as to cover at least a portion of the layer 14 and is provided with a pair of ends 23 and 24 for establishing electrical connection thereto.

Figure 2:
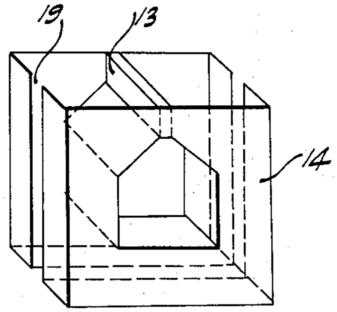
Fig. 2 is a view in perspective of the gap shim and eddy current shield of the embodiment of Fig. 1.

The eddy current shield thus formed and described is illustrated more clearly in Fig. 2, where a view of the embodiment of Fig. 1 with the core structure 10 and the coil 22 removed is shown. It will readily be recognized that the shield forms a substantially continuous cover for the core structure, and accordingly, effectively concentrates stray flux in the pole face region of the transducer. The gap 19 may also be clearly seen in this view.

Figure 3:
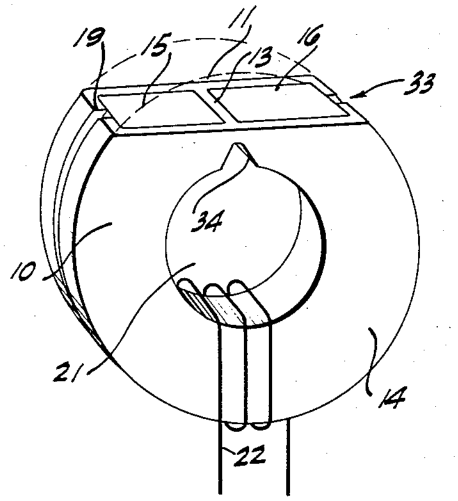
Fig. 3 is a perspective view of another embodiment of the present invention in which the transducer core structure is substantially toroidal in shape.

The present invention is not restricted to rectilinear forms of core structure but is equally applicable to any of the generally well known forms of core structure utilized in the magnetic transducer art. Thus, an embodiment of the present invention, as shown in Fig. 3, includes a substantially toroidally shaped core structure 10 of ferro-magnetic material in which a gap 11 extending from the outer diameter of the core to the inner diameter has been cut. A second cut 33 has also been made to define a flat surface on the outside of the core. The plane of the second cut 33 and of the gap 11 are arranged to define a pair of substantially flat adjacent pole faces 15 and 16 on one side of the toroidal core 10. The transducer core structure has one additional section removed corresponding to a V-shaped notch 34 contiguous with the gap 11 and positioned with the arms of the V-shaped cut opening on the inner aperture of the core 21 and the apex of the V falling within gap 11. A shim 13 of electro-conductive material is arranged to fill gap 11, one edge of the shim lying in the plane defined by the adjacent edges of pole faces 15 and 16. The remaining surfaces of the transducer, that is, of core 10, except pole faces 15 and 16, are covered with an open circuited layer 14 of electro-conductive material. As heretofore pointed out, layer 14 must not form a short circuiting turn about the core structure and accordingly a gap 19 is provided about the outer surface of the core structure. The shield 14 is arranged to form an electrical connection with the shim 13 at its ends and at the edge of the shim falling within the notch 34.

While the transducer of Fig. 3 has been described in terms of its final configuration, fabrication of the transducer may be considerably simplified if the coating of the core with layer 14 is done prior to the forming of pole faces 15 and 16. Thus a toroidally shaped core having a substantially rectangular cross section may be taken as the starting point for the fabrication of the transducer. This core, shown in Fig. 3 by the dashed lines, may be cut and ground along a radial plane to provide gap 11 and notch 34 of appropriate dimension. The shim 13, having dimensions larger than the final dimensions of the shim may then be placed in the gap 11 and appropriate masking tapes be applied to the core to provide for the gap 19. The entire structure thus formed may be covered with an electro-conductive layer 14 as by plating or any similar operation desired. Following the coating of the core structure 10, the masking tapes may be removed and the side of the cores may be ground away to define the pole faces 15 and 16. Alternatively, the pole faces may be formed by cutting the core structure with a saw passing across the core structure in the plane 33. The coil 22 comprising the exciting winding for the transducer may then be wound in place.

While the shim 13 and the shield 14 may be fabricated from different pieces of material, the embodiments of the present invention thus far described do not lend themselves to such a mode of construction. Where substantially rectangular core pieces are utilized, however, the shim and shield may be fabricated from a single piece of material. An embodiment of the present invention utilizing substantially rectangular core pieces and a single strip of electro-conductive material for the shim and shield is shown in Fig. 4.

Figure 4:
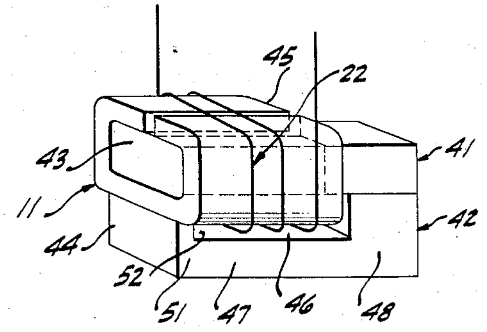
Fig. 4 is a view in perspective of yet another embodiment of the present invention utilizing substantially rectangular bar elements for the core structure.

As shown in Fig. 4, the embodiment comprises a pair of substantially rectangular core pieces 41 and 42 of ferro-magnetic material with one end of each defining one of a pair of adjacent pole faces 43 and 44. A band of electro-conductive material 45 is arranged to substantially encircle core piece 41, the band having one edge lying in the plane defined by the adjacent edges of pole face ends 43 and 44. An exciting coil 22 comprising a plurality of turns of wire is wound about the conductive band 45. The core piece 42 is arranged to bear against the shim 45 at its pole face end and against the core piece 41 in a region remote from the pole face ends. In order to provide a window to receive the coil 22, the core piece 42 is cut away in the region adjacent the coil forming the window 46. This window 46 when cut in the core piece 42 defines two parts of the core lying substantially at right angles to the core pieces.

The core piece 42, as shown in Fig. 4, includes a midsection 47 of substantially rectangular cross section, a back leg 48 of similar cross section and a front leg 51 of reduced cross section. The back leg 48 and the front leg 51 are each disposed at substantially right angles to the mid section 47. Alternatively, the front leg 51 may have a rectangular cross-sectional area which decreases in area as one proceeds along the leg away from the midsection 47 and toward the end of the leg adjacent the gap 11. The front leg 51 and the back leg 48 are of substantially the same length, but have been shown as of dissimilar length in order to more clearly illustrate the interrelation of the various parts of the transducer.

Accordingly, the eddy current shield comprising the conductive strip 45 in the embodiment of Fig. 4 corresponds substantially to the shield 14 of Fig. 1 except that the strip 45 covers only a portion of the transducer core structure. It has been found, however, that the objects of the present invention may be achieved in an embodiment such as that of Fig. 4 if care is taken to insure that the exciting coil for the transducer is wound about the shield and at least one of the pole pieces is shaped to provide a substantially reduced cross-sectional area for the core piece at the transducer gap. The performance of the transducer may be considerably enhanced by providing that this cross-sectional area be as small as possible. The exciting winding 22 should also be positioned as closely adjacent the pole face end of the transducer as is feasible in order to increase the effectiveness of the conductive shim 45.

What is claimed as new is:

1. An electro-magnetic transducer comprising: a transducer core structure of ferro-magnetic material having a gap therein, said gap defining the juxtaposed edges of a pair of adjacent pole faces lying along the outer surface of said core structure and a pair of confronting pole tips lying in parallel planes at substantially right angles to said outer surface; a shim of electro-conductive material arranged to fill said gap in said transducer core structure, said shim having one edge abutting said outer surface; a discontinuous shield of electro-conductive material covering at least a portion of the surface of said transducer core structure, said shield being electrically connected to the edges of said shim other than said one edge; and an exciting winding comprising a plurality of turns of wire wound about said core structure and covering at least a portion of said shield.

2. The electro-magnetic transducer as defined in claim 1 wherein said pole tips have a cross-sectional area less than the cross-sectional area of the remaining portions of said transducer core structure.

3. An electro-magnetic transducer comprising a transducer core structure of ferro-magnetic material having an outer side thereof adapted for presentation to a magnetic record body, said side having a gap therein; a shim of electro-conductive material arranged to fill said gap in said transducer core structure, said shim having one edge lying in the plane defined by said outer side of said core structure; a discontinuous shield of electro-conductive material covering at least a portion of said transducer core structure, said shield being electrically connected to the edges of said shim other than said one edge; and an exciting winding comprising a plurality of turns of wire wound about said core structure and covering at least a portion of said shield.

4. The electro-magnetic transducer defined in claim 3 wherein said transducer core structure is further defined in the region of said gap to have a cross-sectional area less than the cross-sectional area of the remaining portions of said core structure.

5. An electro-magnetic transducer comprising: a substantially rectangular core structure of ferro-magnetic material having a substantially rectangular aperture adapted to permit the winding of an exciting coil thereon, and a gap in one side thereof, said gap defining a pair of confronting pole tips lying in parallel planes at substantially right angles to the outer surface of said side, said core being further shaped adjacent said gap to reduce the cross-sectional area of said confronting pole tips to an area less than the remaining portions of said core structure; a shim of electro-conductive material arranged to fill said gap intermediate said confronting pole tips, said shim having one edge lying in the plane defined by the outer surface of said side; a discontinuous shield of electro-conductive material covering the surfaces of said transducer other than said outer surface, the discontinuity in said shield being positioned to prevent the formation of short circuited turns about said core structure, said shield being connected to the edges of said shim other than said one edge; and an exciting winding comprising a plurality of turns of wire wound about said core structure and covering a portion of said shield.

6. An electro-magnetic transducer comprising: a transducer core structure of ferro-magnetic material having a gap therein, said gap defining a pair of adjacent pole faces lying along an outer surface of said transducer; a shim of electro-conductive material positioned to fill said gap, said shim having one edge abutting said outer surface; a shield of electro-conductive material substantially covering the surfaces of said transducer core structure other than the surfaces comprising said adjacent pole faces, said shield having a discontinuity therein to prevent the circulation of current around said core, said shield being electrically connected to said shim; and an exciting winding comprising a plurality of turns of wire wound about said core structure and covering at least a portion of said shield.

7. An electro-magnetic transducer comprising: a substantially toroid-shaped core of ferro-magnetic material having a gap therein, said gap lying in a radial plane of said core, said toroid being formed in the region of said gap to produce a pair of adjacent pole faces on an outer surface thereof lying on each side of said gap; a shield of electro-conductive material substantially covering the surfaces of said transducer core structure other than the surfaces comprising said adjacent pole faces, said shield having a discontinuity therein to prevent the circulation of current around said core, said shield being electrically connected to said shim; and an exciting winding comprising a plurality of turns of wire wound about said core structure and covering at least a portion of said shield.

8. An electro-magnetic transducer comprising: a transducer core structure including first and second substantially rectangular bars of ferro-magnetic material, said first bar having first and second leg portions disposed at substantially right angles to said bar; said first leg portion having a cross-sectional area less than the cross-sectional area of the remaining portions of said bar; a shield of electro-conductive material substantially encircling said second rectangular bar; and an exciting winding wound over a portion of said shield, said first and second bars being placed in abutting relationship whereby the tip of said first leg bears against said shield, and a side of said first leg, an edge of said shield and an end of said second bar form a substantially continuous pole face end of the transducer for presentment to a magnetic record body.

References Cited in the file of this patent

UNITED STATES PATENTS

| | | |
|---|---|---|
| 2,459,299 | West | Jan. 18, 1949 |
| 2,615,097 | Camras | Oct. 21, 1952 |
| 2,659,845 | Calvert | Nov. 17, 1953 |
| 2,761,911 | Camras | Sept. 4, 1956 |

FOREIGN PATENTS

| | | |
|---|---|---|
| 733,913 | Germany | Apr. 5, 1943 |